(12) United States Patent
Weinlich

(10) Patent No.: US 11,468,597 B2
(45) Date of Patent: Oct. 11, 2022

(54) CORRECTION METHOD, AND DEVICE FOR CORRECTING IMAGE DATA

(71) Applicant: Continental Automotive GmbH, Hannover (DE)

(72) Inventor: Andreas Weinlich, Munich (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 90 days.

(21) Appl. No.: 17/045,973

(22) PCT Filed: Apr. 3, 2019

(86) PCT No.: PCT/EP2019/058348
§ 371 (c)(1),
(2) Date: Oct. 7, 2020

(87) PCT Pub. No.: WO2019/197230
PCT Pub. Date: Oct. 17, 2019

(65) Prior Publication Data
US 2021/0125374 A1    Apr. 29, 2021

(30) Foreign Application Priority Data
Apr. 10, 2018 (DE) .................... 10 2018 205 399.5

(51) Int. Cl.
*G06T 7/80* (2017.01)
*G06T 5/00* (2006.01)
*G06T 5/50* (2006.01)

(52) U.S. Cl.
CPC .............. *G06T 7/80* (2017.01); *G06T 5/006* (2013.01); *G06T 5/50* (2013.01)

(58) Field of Classification Search
CPC .............. G06T 7/80; G06T 5/006; G06T 5/50
See application file for complete search history.

(56) References Cited

U.S. PATENT DOCUMENTS

| 6,937,282 B1 | 8/2005 | Some .......................... 348/335 |
| 2006/0093239 A1 | 5/2006 | Kakinami ................ G06K 9/40 |
| 2014/0241590 A1* | 8/2014 | Day, Jr. ............. G01N 15/1468 |
| | | 382/110 |

FOREIGN PATENT DOCUMENTS

| CN | 110103219 A * | 8/2019 | ............ B25J 9/1692 |
| DE | 102018205399 A1 * | 10/2019 | ............ G06T 5/006 |
| EP | 2660776 A1 * | 11/2013 | ........... A61B 6/0492 |

OTHER PUBLICATIONS

Search Report for International Application No. PCT/EP2019/058348, 10 pages, dated May 29, 2019.

(Continued)

*Primary Examiner* — Charles T Shedrick
(74) *Attorney, Agent, or Firm* — Slayden Grubert Beard PLLC

(57) ABSTRACT

Various embodiments include a correction method comprising: A) reading in data of an image of a calibration pattern recorded with an optical unit, the pattern including some structures; B) simulating a line through the image, the line extending through a reference point subdividing the line into half-lines, each intersecting the imaged structures; C) determining a first and a second sequence of measured values representing distances resulting from the intersection points on the half-lines line with respect to the reference point; D) determining a third and a fourth sequence of target values representing target distances of the intersection points; E) determining a mapping specification that at least approximately maps the target values of the third and fourth sequences to the measured values of the first and second sequences, or vice versa; and F) correcting image data of an image recorded using an optical unit using the mapping specification of step E).

21 Claims, 6 Drawing Sheets

(56) References Cited

OTHER PUBLICATIONS

Office Action for DE Application No. 10 2018 205 399.5, 5 pages, dated Apr. 9, 2019.
Hughes C. et al., "Wide-Angle Camera Technology for Automotive Applications: A Review," IET Intelligent Transportation System, 2009, vol. 3, No. 1, 13 pages, Mar. 9, 2009.
Wolfgang Hugemann, "Correcting Lens Distortions in Digital Photographs," 12 pages, 2010.
F. Devernay et al., "Straight Lines Have to Be Straight: Automatic Calibration and Removal of Distortion From Scenes of Structured Environments," Machine Vision and Applications (2001) 13:14-24, 11 pages, Dec. 27, 1999.
L. Alvarez et al., "An Algebraic Approach to Lens Distortion by Line Rectification," J Math Imaging Vis (2009) 35:36-50, 15 pages, May 2, 2009.
Wang Quanzeng et al., "Development of the Local Magnification Method for Quantitative Evaluation of Endoscope Geometric Distortion," Journal of Biomedical Optics, May 2106, vol. 21(5), 14 pages, May 1, 2016.
Remy S. et al. "Estimating the Radial Distortion of an Optical System; Effect on a Localization Process," 5 pages, Nov. 13, 1994.
Junhee Park et al., "Lens Distortion Correction Using Ideal Image Coordinates," 5 pages, Aug. 1, 2009.
Qiyue Wang et al., "Radial Distortion Correction in a Vision System," Journal Optical Society of America, vol. 55, No. 31, 8 pages, Nov. 1, 2016.

\* cited by examiner

{7,3 ; 6,8 ; 6,2 ; 5,4 ; 4,4 ; 3,2 ; 1,8 ; 0,2}

{0,8 ; 2,4 ; 3,8 ; 5,0 ; 6,0 ; 6,8 ; 7,2}

{7,2 ; 6,2 ; 5,2 ; 4,2 ; 3,2 ; 2,2 ; 1,2 ; 0,2}

{0,8; 1,8; 2,8 ; 3,8 ; 4,8 ; 5,8 ; 6,8}

CORRECTION METHOD, AND DEVICE FOR CORRECTING IMAGE DATA

CROSS-REFERENCE TO RELATED APPLICATIONS

This application is a U.S. National Stage Application of International Application No. PCT/EP2019/058348 filed Apr. 3, 2019, which designates the United States of America, and claims priority to DE Application No. 10 2018 205 399.5 filed Apr. 10, 2018, the contents of which are hereby incorporated by reference in their entirety.

TECHNICAL FIELD

The present disclosure relates to imaging. Various embodiments include correction methods and/or devices for correcting image data.

SUMMARY

Various embodiments of the teachings herein include correction methods for correcting image data recorded by means of an optical unit. Additional embodiments include devices that can be used to carry out such a correction method. For example, some embodiments include a correction method, comprising the following steps: A) reading in image data, wherein the image data are representative of a calibration image (1') of a calibration pattern (1) recorded by means of an optical unit (2), the calibration pattern (1) comprises a plurality of structures (10) and the calibration image (1') comprises correspondingly imaged structures (10'); B) simulating a line (4) through the calibration image (1'), such that the line (4) extends through a reference point (5), which subdivides the line (4) into a first half-line (41) and a second half-line (42), and the first half-line (41) and the second half-line (42) each intersect the imaged structures (10') at one or more intersection points (40); C) determining a first and a second sequence of measured values representing distances—resulting from the calibration image (1')—of the intersection points (40) on the first half-line (41) and on the second half-line (42) with respect to the reference point (5); D) predetermining or determining a third and a fourth sequence of target values representing target distances of the intersection points (40) on the first half-line (41) and on the second half-line (42) with respect to the reference point (5); E) determining a mapping specification that at least approximately maps the target values of the third and fourth sequences to the measured values of the first and second sequences, or vice versa; and F) correcting image data of an image recorded by means of an optical unit by way of the mapping specification determined in step E).

In some embodiments, the structures (10) are lines (10) extending parallel.

In some embodiments, the line (4) is simulated such that it intersects at least one of the imaged lines (10') at an angle of at least 80°.

In some embodiments, the structures (10) are mutually equidistant.

In some embodiments, in step D) the third and fourth sequences are predetermined or determined such that virtual intersection points on the line (4) which have distances with respect to the reference point (5) that correspond to the target values are mutually equidistant.

In some embodiments, the intersection point of the calibration image (1') with an optical axis of the optical unit (2) or an image center of the calibration image (1') is chosen as the reference point (5).

In some embodiments, in step D) the third and fourth sequences are predetermined or determined in such a way that distances between adjacent virtual intersection points on the line (4) which have distances with respect to the reference point (5) that correspond to the target values increase or decrease monotonically and linearly along the line (4).

In some embodiments, the method furthermore comprises the following steps: D1) determining a first number n1 of intersection points (40) on the first half-line (41) which are within a predetermined maximum distance (M) from the reference point (5); D2) determining a second number n2 of intersection points (40) on the second half-line (42) which are within the predetermined maximum distance (M) from the reference point (5); the linear increase or decrease is chosen in this case such that exactly n1 virtual intersection points having distances with respect to the reference point of at most a target maximum distance fit on the first half-line (41) and exactly n2 virtual intersection points having distances with respect to the reference point (5) of at most the target maximum distance fit on the second half-line (42).

In some embodiments, in step D) the respective smallest target values of the third and fourth sequences are predetermined such that the sum of these two smallest target values corresponds to a predetermined value, and the ratio of the smallest target value of the third sequence to the smallest target value of the fourth sequence is equal to the ratio of the smallest measured value of the first sequence to the smallest measured value of the second sequence.

In some embodiments, in step D) the respective smallest target values of the third and fourth sequences are determined by means of an iterative method, wherein the condition that the sum of these two smallest target values corresponds to a predetermined value is predetermined as a boundary condition.

In some embodiments, a polynomial is used as the mapping specification.

In some embodiments, a plurality of different lines (4) through the calibration image (1') are simulated and a first and a second sequence of measured values and a third and a fourth sequence of target values are determined with respect to each line (4), the sequences of each line (4) are used for determining the mapping specification.

In some embodiments, there is device (100) for correcting image data, which is configured to carry out a correction method as described herein.

BRIEF DESCRIPTION OF THE DRAWINGS

The correction methods and devices described here are explained in greater detail below on the basis of exemplary embodiments with reference to drawings. In this case, identical reference signs indicate identical elements in the individual figures. Relations to scale are not illustrated in this case, however; rather, individual elements may be illustrated with an exaggerated size in order to afford a better understanding. In the figures.

DETAILED DESCRIPTION

Figure 1:
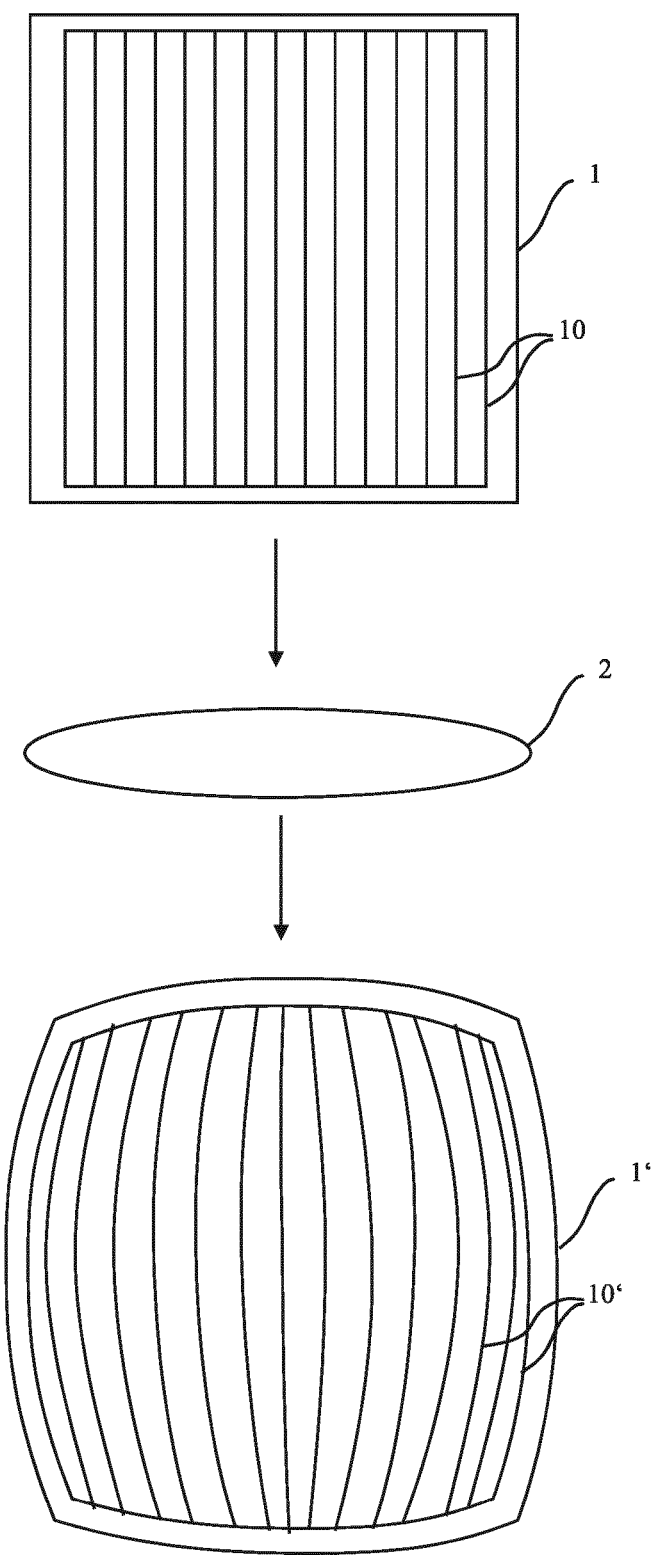
FIGS. 1 to 7 show various positions in exemplary embodiments of correction methods incorporating teachings of the present disclosure.

In accordance with at least one embodiment, the correction method comprises a step A), in which image data are read in. The image data are representative of a calibration image of a calibration pattern recorded by means of an optical unit. The calibration pattern comprises a plurality of structures, in particular lines or points, such as grid lines or grid points, for example, and the calibration image comprises correspondingly imaged structures.

By way of example, the calibration image is subdivided into a plurality of pixels, wherein the image data represent intensities for color values in the individual pixels.

The optical unit is for example a lens or a lens system, for example of a camera or of a microscope or of an objective.

In some embodiments, the structures of the calibration pattern stand out optically clearly from the background of the calibration pattern. By way of example, the calibration pattern is a black-and-white pattern. The structures are arranged in a regular pattern, for example. The structures of the calibration pattern are preferably straight lines and/or lines extending parallel to one another. If the calibration pattern comprises points, then the latter are preferably arranged in a regular grid. However, the calibration pattern can also be a chequered pattern.

The calibration pattern used can be, for example, any scene in which lines and/or points are discernible, preferably at an identical distance with respect to the reference point, such as the optical image center.

Although lines of the calibration pattern extend straight and/or parallel, for example, the imaged lines of the calibration image can extend in a curved manner. This can be attributed to imaging aberrations of the optical unit, for example. The correction method described here is configured, in particular, to correct such imaging aberrations of the optical unit.

In accordance with at least one embodiment, the method comprises a step B), in which a line through the calibration image is simulated, such that the line extends through a reference point, which subdivides the line into a first half-line and a second half-line, and the first half-line and the second half-line each intersect the imaged structures at one or more intersection points. That is to say that each half-line crosses one or more of the imaged structures.

In this case, the intersection points can be annotated either manually or fully automatically, for example by a gradient detection method in the case of a black-and-white calibration pattern. By way of example, the first half-line and the second half-line each intersect the imaged lines at at least two or at least four or at least eight intersection points.

In accordance with at least one embodiment, the method comprises a step C), in which a first and a second sequence of measured values are determined, wherein the measured values represent the distances—resulting from the calibration image—of the intersection points on the first half-line and on the second half-line with respect to the reference point.

The first sequence and the second sequence are thus sequences of numbers in each case. The sequence elements in the sequences of numbers are the measured values mentioned. The measured values preferably represent in each case the absolute value of the distance of an intersection point with respect to the reference point. Here the first sequence represents only the intersection points on the first half-line and the second sequence represents only the intersection points on the second half-line. The sequences thus each comprise for example the same number of sequence elements as the number of intersection points on the associated half-lines. In some embodiments, it is also possible for only some of the intersection points to be annotated, with the result that the sequences have fewer elements than intersection points.

In accordance with at least one embodiment, the method comprises a step D), in which a third and a fourth sequence of target values are predetermined or determined, wherein the target values represent target distances of the intersection points on the first half-line and on the second half-line with respect to the reference point. The third and fourth sequences are thus in turn sequences of numbers, with the target values as sequence elements. The target values are predetermined or determined in particular such that they each represent or specify an expected distance of an intersection point with respect to the reference point. In this case, the third sequence represents the intersection points on the first half-line and therefore comprises the same number of sequence elements as the first sequence. The fourth sequence represents the intersection points on the second half-line and therefore comprises the same number of sequence elements as the second sequence. In particular, therefore, each measured value of the first sequence is assigned one-to-one a target value of the third sequence and each measured value of the second sequence is assigned one-to-one a target value of the fourth sequence.

In accordance with at least one embodiment, the method comprises a step E), in which a mapping specification is determined that at least approximately maps the target values of the third and fourth sequences to the measured values of the first and second sequences, or vice versa. The mapping specification is, in particular, a function $F: \mathbb{R} \to \mathbb{R}$. In this case, each target value of the third and fourth sequences is approximately mapped to the assigned measured value of the first and second sequences. In some embodiments, a mapping specification can also be determined that at least approximately maps the measured values of the first and second sequences to the target values of the third and fourth sequences.

In this disclosure, "at least approximately" means that in particular a minimization method, for example according to the least squares method, is used for determining the mapping specification. In particular, the number of parameters of the mapping specification that is determined by the minimization method is less than the number of target values or measured values.

In accordance with at least one embodiment, the method comprises a step F), in which image data of an image recorded by means of an optical unit are corrected by way of the mapping specification determined in step E). The optical unit is preferably the same optical unit that was used to record the calibration image, or a similar optical unit. The image data can be the image data of the calibration image or of some other image recorded by means of an optical unit.

During the correction, a corrected image is thus generated from the recorded image, in which corrected image the imaging aberrations of the optical unit may be partly or completely corrected. The recorded image is corrected for example as follows: The corrected image is intended to have a certain number of pixels, for example the same number of pixels as the recorded image. For each pixel of the corrected image, the distance of this pixel with respect to the reference point is determined. The value that the mapping specification determined in step E) assigns to said distance is subsequently determined. An appropriately matching pixel of the recorded image is thereupon determined, which pixel lies on the same line through the reference point as the pixel of the corrected image and has this determined value as distance with respect to the reference point. The image data assigned to this pixel in the recorded image are then assigned to the pixel for the corrected image. In particular, the recorded image is thus radially rectified or corrected with the aid of the mapping specification, wherein the reference point represents the center for the radial rectification.

In accordance with at least one embodiment, steps A) to F) are performed in the stated order. In at least one embodiment, the correction method comprises steps A), B), C), D), E), F). In step A), image data are read in, wherein the image data are representative of a calibration image of a calibration pattern recorded by means of an optical unit. The calibration pattern comprises a plurality of structures and the calibration image comprises correspondingly imaged structures.

In step B), a line through the calibration image is simulated, such that the line extends through a reference point, which subdivides the line into a first half-line and a second half-line, and the first half-line and the second half-line each intersect the imaged structures at one or more intersection points. In step C), a first and a second sequence of measured values are determined, which represent the distances—resulting from the calibration image—of the intersection points on the first half-line and on the second half-line with respect to the reference point.

In step D), a third and a fourth sequence of target values are predetermined or determined, wherein the target values represent target distances of the intersection points on the first half-line and on the second half-line with respect to the reference point. In step E), a mapping specification is determined that at least approximately maps the target values of the third and fourth sequences to the measured values of the first and second sequences, or vice versa. In step F), image data of an image recorded by means of an optical unit are corrected by way of the mapping specification determined in step E).

In some embodiments, distances of intersection points with respect to a reference point, which should assume specific values in the absence of a distortion of the optical unit, are indeed mapped exactly to these values. Unlike in alternative methods in which, for example, imaged curved grid lines are mapped to straight grid lines, only distances are corrected here, which considerably reduces the computational complexity. The method, in particular the determination of the mapping specification, is thus particularly fast.

A parameterization of the minimization method is not necessary, as a result of which the method is very stable and functions robustly for valid input data. The rectification or correction is not restricted to certain distance ranges from the reference point or image center, but rather is equally precise and stable from the reference point right into the image corners. The implementation of the method, for example in a computing unit or a processor, proves to be simple and clear. An automated identification of the intersection point of the simulated line with imaged structures is algorithmically simple, as a result of which a fully automatic implementation is robust. The exact alignment of the calibration pattern perpendicular to the optical unit is not necessary.

In accordance with at least one embodiment, the structures are lines extending parallel, preferably equidistant lines. The lines can be straight or curved.

In accordance with at least one embodiment, the line is simulated such that it intersects at least one of the imaged lines at an angle of at least 80°. The greater the angle between the simulated line and the imaged lines, the more intersection points there are on the first half-line and the second half-line and the more precisely the mapping specification can be determined.

In accordance with at least one embodiment, the structures are mutually equidistant. That is to say that adjacent structures are always at the same distance with respect to one another.

In accordance with at least one embodiment, in step D) the third and fourth sequences are predetermined or determined such that virtual intersection points on the line which have distances with respect to the reference point that correspond to the target values are mutually equidistant. That is to say that if the intersection points had the target values as distances with respect to the reference point, then the intersection points would be mutually equidistant, such that two adjacent intersection points on the line would always be at the same distance with respect to one another.

The virtual intersection points are not actual intersection points, but rather only fictive intersection points. In this embodiment, therefore, the mapping specification is determined such that imagings of originally equidistant structures appear equidistant again as much as possible after the correction using the mapping specification.

In accordance with at least one embodiment, the intersection point of the calibration image with an optical axis of the optical unit is chosen as the reference point. Alternatively, the image center of the calibration image can also be chosen as the reference point.

In accordance with at least one embodiment, the method furthermore comprises a step D1), which involves determining a first number n1 of intersection points on the first half-line which are within a predetermined maximum distance from the reference point. The maximum distance may be chosen to be less than a maximum distance of an image edge of the calibration image with respect to the reference point.

In accordance with at least one embodiment, the method furthermore comprises a step D2), which involves determining a second number n2 of intersection points on the second half-line which are within the predetermined maximum distance from the reference point.

In accordance with at least one embodiment, in step D) the third and fourth sequences are predetermined in such a way that distances between virtual intersection points on the line which have distances with respect to the reference point that correspond to the target values increase or decrease monotonically and linearly along the line. To put it another way: if the intersection points had the target values as distances with respect to the reference point, then the distances between the intersection points would either increase monotonically linearly or decrease monotonically linearly along the line.

The distance between a second virtual intersection point and a third virtual intersection point is thus greater than the distance between a first virtual intersection point and the second virtual intersection point by a value m, for example. The distance between the third virtual intersection point and a fourth virtual intersection point in turn is greater than the distance between the second virtual intersection point and the third virtual intersection point by the value m, and so on. The gradient m is a real number, for example.

In accordance with at least one embodiment, the linear increase or decrease is chosen in this case such that exactly n1 virtual intersection points having distances with respect to the reference point of at most a target maximum distance fit on the first half-line and exactly n2 virtual intersection points having distances with respect to the reference point of at most the target maximum distance fit on the second half-line.

That is to say that the gradient m is predetermined such that over a segment on the line, the length of which corresponds to twice the target maximum distance, and which is halved by the reference point, exactly n1+n2 virtual intersection points fit, between which the distance increases or decreases with the gradient m.

This procedure makes it possible to take into account, in particular, a tilting of the calibration pattern during recording by means of the optical unit. In an image without distortion by the optical unit, such a tilting would lead for example to imaged grid lines whose distances increase or decrease linearly in one direction. Accordingly, the target values are chosen here such that the correction of the calibration image by means of the mapping specification leads substantially to grid lines having linearly increasing or decreasing distances.

In order to improve the accuracy, decimal fractions could be employed here instead of integer numbers at intersection points. In this case, both the ratio of the intersection points closest to the reference point and the distance of the intersection point furthest from the reference point with respect to the maximum distance are taken into account, for example by means of a linear interpretation. In order to increase the accuracy, it is likewise appropriate to choose the maximum distance to be as large as possible. By way of example, the intersection point furthest away from the reference point of that half-line for which said intersection point has the smaller distance with respect to the reference point is chosen as the maximum distance.

In accordance with at least one embodiment, in step D) the respective smallest target values of the third and fourth sequences are predetermined such that the sum of these two smallest target values corresponds to a predetermined value. If the target values in the third and fourth sequences are predetermined for example such that distances between corresponding virtual intersection points on the line are always identical, then the sum of the two smallest target values is predetermined for example such that it likewise corresponds to this distance.

By contrast, if the target values are predetermined for example such that the distances of corresponding virtual intersection points increase or decrease monotonically and linearly along the line, then the sum of the two smallest target values is predetermined such that this linear increase or decrease is maintained.

In accordance with at least one embodiment, in step D) the respective smallest target values of the third and fourth sequences are predetermined such that the ratio of the smallest target value of the third sequence to the smallest target value of the fourth sequence is equal to the ratio of the smallest measured value of the first sequence to the smallest measured value of the second sequence.

In accordance with at least one embodiment, in step D) the respective smallest target values of the third and fourth sequences are determined by means of an iterative method, wherein the condition that the sum of these two smallest target values corresponds to a predetermined value is predetermined as a boundary condition. By way of example, the predetermined value is chosen as described above.

Thus, instead of predetermining a fixed value from the outset for the ratio of the smallest target values of the third and fourth sequences, this value is determined, in particular by means of an iterative minimization method. The smallest target values are ascertained for example simultaneously or together with the mapping specification by way of the minimization method.

In accordance with at least one embodiment, a polynomial is used as the mapping specification. By way of example, an at most sixth-degree polynomial is used. In some embodiments, a fourth-degree polynomial is used. In some embodiments, the constant element of the polynomial is set to the fixed value zero.

A non-polynomial function for radial lens rectification which is likewise linear in terms of its parameters can also be used as the mapping specification. For non-polynomial functions for radial lens rectification which are nonlinear in terms of their parameters, it is possible to use the method where a linear minimization method is replaced by a non-linear minimization method. However, this typically leads to iterative solution methods.

In accordance with at least one embodiment, the calibration image has a rectangular format.

In accordance with at least one embodiment, the imaged structures in the form of imaged lines extend diagonally over the calibration image. If the simulated line then intersects the imaged lines at an angle of at least 80°, for example, then the simulated line also extends substantially diagonally over the calibration image, as a result of which the number of intersection points with the imaged lines and at the same time the accuracy of the method increase.

In accordance with at least one embodiment, a plurality of different lines through the calibration image are simulated and a first and a second sequence of measured values and a third and a fourth sequence of target values are determined with respect to each line. The third and fourth sequences of target values can be determined in accordance with the previous embodiments for a plurality or all of the lines.

In accordance with at least one embodiment, the sequences of each line are used for determining the mapping specification. As a result, the number of points taken as a basis for determining the mapping specification increases, which increases the accuracy of the method.

Furthermore, a device for correcting image data is specified. The device is suitable, in particular, for carrying out a correction method described here. That is to say that all features disclosed in association with the correction method are also disclosed for the device, and vice versa.

The device can comprise a processor, in particular, which carries out the various method steps. The device can be for example a camera, in particular a digital camera. By way of example, the device comprises the optical unit, that is to say for example the lens or the lens system, by means of which the calibration image is recorded.

In some embodiments, there is a computer program configured to carry out the correction method described here. In some embodiments, there is a computer program product comprising an executable program code, wherein, upon execution by a data processing device, the program code executes the correction method described here.

FIG. 1 shows a first position in one exemplary embodiment of the correction method. A calibration image 1' of a calibration pattern 1 is imaged by means of an optical unit 2, in the present case a lens 2. The calibration pattern 1 comprises a plurality of structures 10 in the form of lines 10. In the present case, the lines 10 extend parallel and equidistantly with respect to one another.

The calibration image 1', that is to say the imaging of the calibration pattern 1 by means of the optical unit 2, is distorted. Imaged lines 10' of the calibration image 1' are neither parallel nor equidistant with respect to one another as a result of the distortion. This is attributable to imaging aberrations of the optical unit 2, for example.

Figures 2, 3, 4:
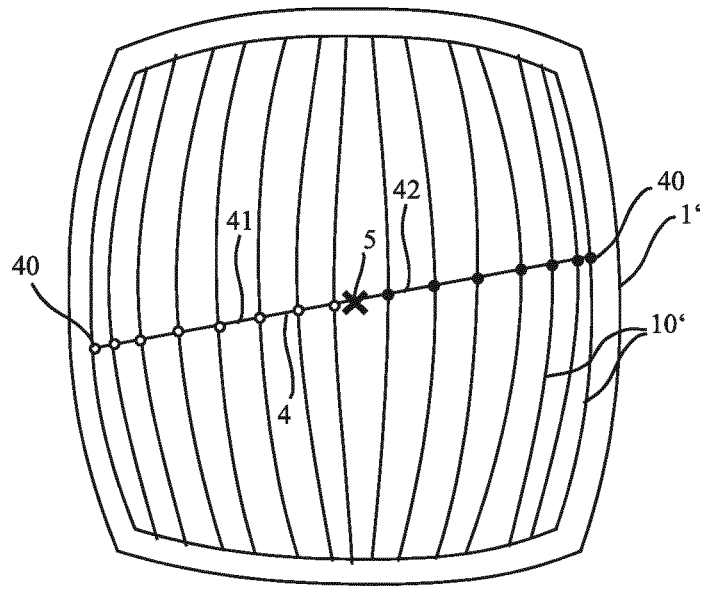

FIG. 2 shows a second position of the correction method. A line 4 is simulated through the calibration image 1', which line extends through a reference point 5 and intersects the imaged lines 10' at a plurality of intersection points 40. In the present case, the reference point 5 is the optical image center or the image midpoint of the calibration image 1'. The reference point 5 subdivides the line 4 in a first half-line 41 and a second half-line 42. There are a plurality of intersection points 40 both on the first half-line 41 and on the second half-line 42.

FIG. 3 shows a third position of the correction method. Proceeding from the intersection points, a first sequence and a second sequence of measured values are ascertained. The measured values of the first sequence represent or are the distances of the intersection points on the first half-line with respect to the reference point. The measured values of the second sequence represent or are the distances of the intersection points on the second half-line with respect to the reference point.

The illustrated eight measured values of the first sequence and the illustrated seven measured values of the second sequence have been chosen purely illustratively and do not correspond to the actual distances of the intersection points 40 shown in FIG. 2 with respect to the reference point.

FIG. 4 shows a fourth position of the correction method. A third and a fourth sequence of target values are predetermined here. The target values of the third sequence represent target distances of the intersection points on the first half-line with respect to the reference point. The target values of the fourth sequence represent target distances of the intersection points on the second half-line with respect to the reference point. Accordingly, the third sequence has exactly the same number of sequence elements as the first sequence, and the fourth sequence has exactly the same number of sequence elements as the second sequence.

In the present embodiment, the target values of the third and fourth sequences are predetermined such that the difference between two adjacent target values in each case is always identical. Moreover, the sum of the smallest target values of the third and fourth sequences corresponds exactly to this difference. That is to say that virtual intersection points on the line whose distances with respect to the reference point correspond to the target values are all mutually equidistant. This is exactly what would be expected for the intersection points if the optical unit had no imaging aberrations. Thus, apart from a scaling factor, the target values correspond to the expected distances of the intersection points with respect to the reference point.

Figure 5:
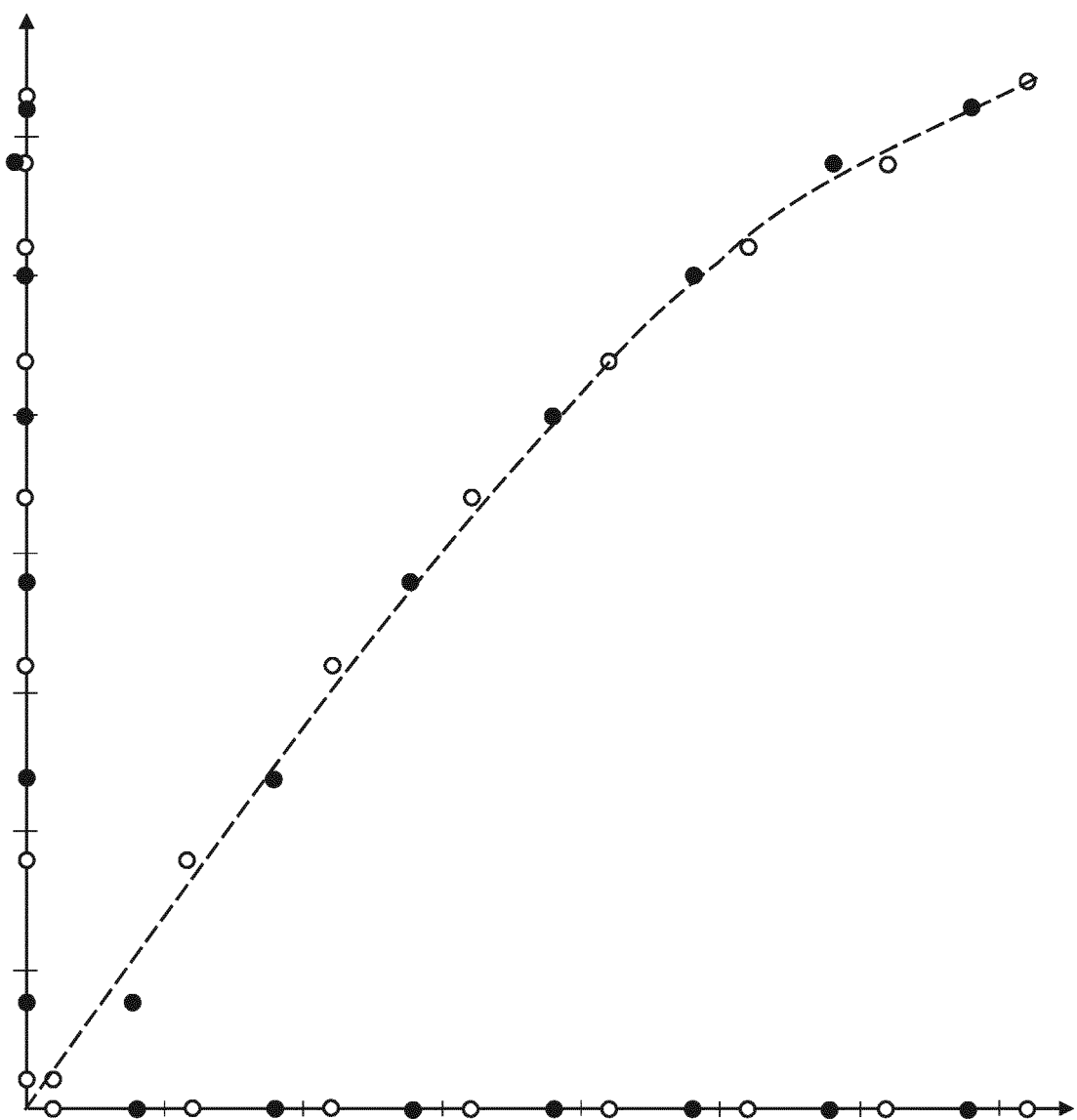

FIG. 5 shows a fifth position of the correction method, in which the target values of the third and fourth sequences are plotted on a horizontal x-axis and the measured values of the first and second sequences are plotted on a vertical y-axis. In this case, the measured values and target values assigned to the first half-line are illustrated as points not filled in; the measured values and target values assigned to the second half-line are illustrated as filled-in points.

The measured values and target values are additionally entered as (x,y)-values in the coordinate systems bound by the x-axis and the y-axis. The (x,y)-values are additionally approximated by a function (dashed line). The function is parameterized by a fourth-degree polynomial, in particular. The parameters of the function are determined for example by means of a minimization method, for example the least squares method. The function represents a mapping specification that at least approximately maps the target values of the third and fourth sequences to the measured values of the first and second sequences.

Figure 6:
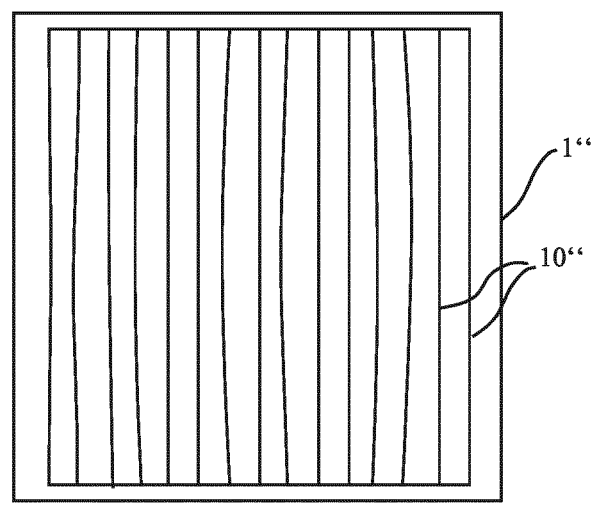

FIG. 6 illustrates a sixth position of the correction method. The image data of the calibration image were radially corrected by means of the mapping specification determined previously. The corrected image 1" illustrated has corrected lines 10" extending approximately parallel and equidistant with respect to one another.

Figure 7:
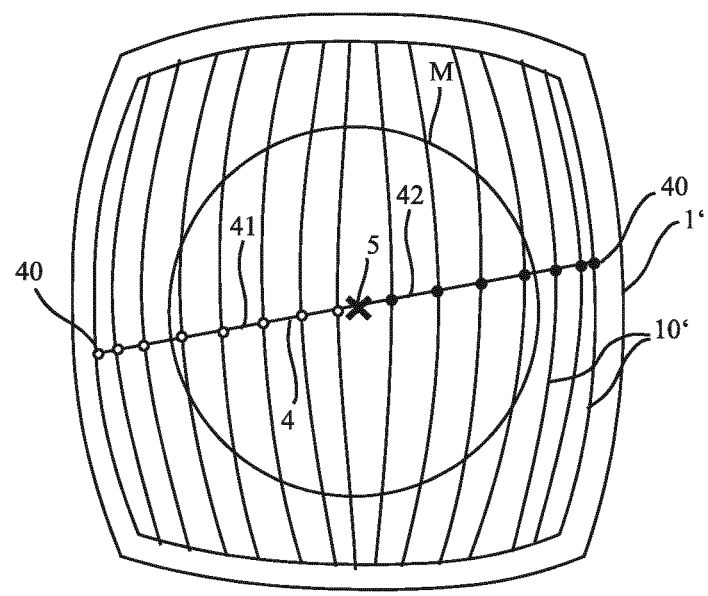

FIG. 7 shows a position of the correction method in which there is a number n1=5 of intersection points 40 on the first half-line 41 having a distance of at most a maximum distance M from the reference point 5. On the second half-line 42 there are n2=4 intersection points 40 having a distance of at most the maximum distance M away from the reference point 5.

If it is assumed that the calibration pattern 1 was tilted during the recording of the calibration image 1', then in the absence of a distortion by the optical unit the distances of the imaged lines 10' would have to appear with linearly ascending or descending distances in accordance with the intercept theorem. Accordingly, the mapping specification should be determined such that after the correction of the image data representing the calibration image 1', distances between the corrected lines decrease or increase linearly.

In order to achieve this, subsequently to the position in FIG. 7, the target values of the third and fourth sequences are predetermined for example such that distances between virtual intersection points on the line which have distances with respect to the reference point that correspond to the target values increase or decrease monotonically and linearly along the line. In order to obtain the correct gradient in this linear increase or decrease, what is predetermined as a boundary condition is, for example, that exactly n1 of said virtual intersection points within a target maximum distance from the reference point 5 fit on the first half-line 41 and exactly n2 virtual intersection points within the same target maximum distance fit on the second half-line 42. Afterward, the corresponding target values and the measured values are plotted as in FIG. 5, for example, and a mapping specification is determined.

Figure 8A:
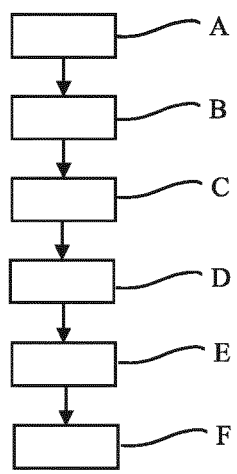
FIGS. 8A and 8B show flow diagrams of different exemplary embodiments of correction methods incorporating teachings of the present disclosure.

FIG. 8A illustrates a flow diagram of one exemplary embodiment of the correction method. Steps A) to F) described above are carried out successively.

Figure 8B:
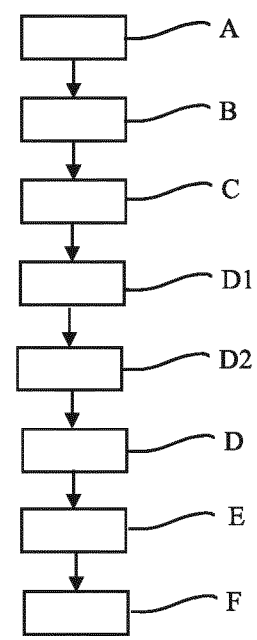

FIG. 8B shows a flow diagram of a further exemplary embodiment. Steps D1) and D2) described above are carried out before step D).

Figure 9:
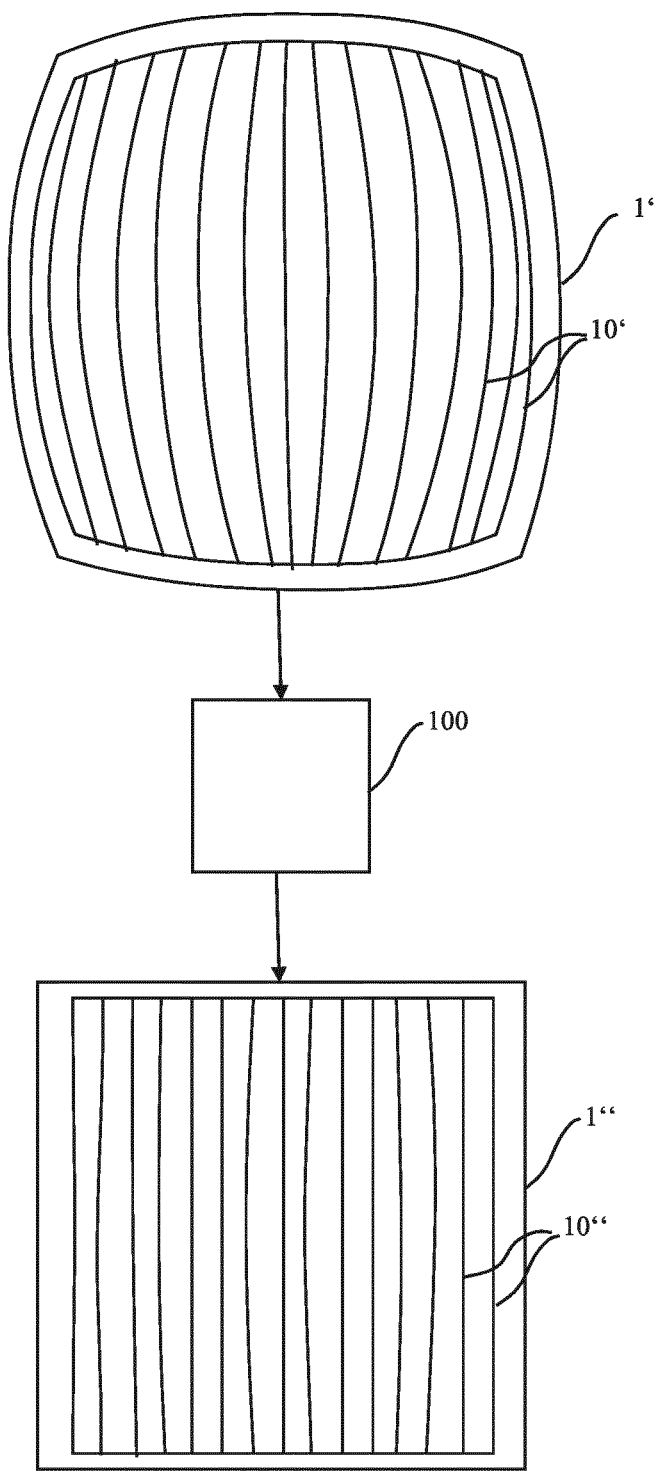
FIG. 9 shows one exemplary embodiment of a device incorporating teachings of the present disclosure.

FIG. 9 shows one exemplary embodiment of a device 100 configured to carry out the correction method. The device 100 comprises a processor, for example. Image data, which here are representative of a calibration image 1' of a calibration pattern recorded by means of an optical unit, are read in. The device carries out the correction method described above. Afterward, corrected image data are output. In the present case, the corrected image data with respect to the image data of the calibration pattern read in are output.

In contrast to the illustration in FIG. 9, the device can also itself comprise the optical unit used to record the calibration image. The device is then a digital camera, for example.

The scope of the present disclosure is not restricted to the exemplary embodiments or by the description on the basis thereof. Rather, the teachings encompass any new feature and any combination of features, which in particular includes any combination of features in the patent claims, even if these features themselves or this combination itself are/is not indicated explicitly in the patent claims or exemplary embodiments.

What is claimed is:

1. A correction method comprising:
   A) reading in image data representative of a calibration image of a calibration pattern recorded with an optical unit, wherein the calibration pattern comprises a plurality of structures and the calibration image comprises correspondingly imaged structures;
   B) simulating a line through the calibration image, wherein the line extends through a reference point subdividing the line into a first half-line and a second half-line, each half-line intersecting the imaged structures at one or more intersection points;
   C) determining a first and a second sequence of measured values representing distances resulting from the calibration image of the intersection points on the first half-line and on the second half-line with respect to the reference point;
   D) determining a third and a fourth sequence of target values representing target distances of the intersection points on the first half-line and on the second half-line with respect to the reference point;
   E) determining a mapping specification that at least approximately maps the target values of the third and fourth sequences to the measured values of the first and second sequences, or vice versa; and
   F) correcting image data of an image recorded using an optical unit with the mapping specification determined in step E;
   wherein, in step D) the respective smallest target values of the third and fourth sequences are determined by means of an iterative method;
   the condition that the sum of these two smallest target values corresponds to a predetermined value is predetermined as a boundary condition.

2. The correction method as claimed in claim 1, wherein the structures comprise parallel lines.

3. The correction method as claimed in claim 2, wherein the line intersects at least one of the imaged lines at an angle of at least 80°.

4. The correction method as claimed in claim 1, wherein the structures are mutually equidistant.

5. The correction method as claimed in claim 1, wherein in step D) the third and fourth sequences are determined such that virtual intersection points on the line which have distances with respect to the reference point corresponding to the target values are mutually equidistant.

6. The correction method as claimed in claim 1, wherein in step D) the third and fourth sequences are determined so distances between adjacent virtual intersection points on the line which have distances with respect to the reference point that correspond to the target values increase or decrease monotonically and linearly along the line.

7. The correction method as claimed in claim 1, wherein the mapping specification includes a polynomial.

8. The correction method as claimed in claim 1, further comprising:
   simulating a plurality of different lines through the calibration image; and
   determining a first and a second sequence of measured values and a third and a fourth sequence of target values with respect to each line; and
   using the sequences of each line for determining the mapping specification.

9. A correction method comprising:
   A) reading in image data representative of a calibration image of a calibration pattern recorded with an optical unit, wherein the calibration pattern comprises a plurality of structures and the calibration image comprises correspondingly imaged structures;
   B) simulating a line through the calibration image, wherein the line extends through a reference point subdividing the line into a first half-line and a second half-line, each half-line intersecting the imaged structures at one or more intersection points;
   C) determining a first and a second sequence of measured values representing distances resulting from the calibration image of the intersection points on the first half-line and on the second half-line with respect to the reference point;
   D) determining a third and a fourth sequence of target values representing target distances of the intersection points on the first half-line and on the second half-line with respect to the reference point;
   D1) determining a first number n1 of intersection points on the first half-line within a predetermined maximum distance of the reference point;
   D2) determining a second number n2 of intersection points on the second half-line within the predetermined maximum distance of the reference point;
   E) determining a mapping specification that at least approximately maps the target values of the third and fourth sequences to the measured values of the first and second sequences, or vice versa; and
   F) correcting image data of an image recorded using an optical unit with the mapping specification determined in step E);
   wherein the linear increase or decrease is chosen in this case such that exactly n1 virtual intersection points having distances with respect to the reference point of at most a target maximum distance fit on the first half-line and exactly n2 virtual intersection points having distances with respect to the reference point of at most the target maximum distance fit on the second half-line;
   wherein the intersection point of the calibration image with an optical axis of the optical unit or an image center of the calibration image is chosen as the reference point.

10. The correction method as claimed in claim 9, wherein the structures comprise parallel lines.

11. The correction method as claimed in claim 10, wherein the line intersects at least one of the imaged lines at an angle of at least 80°.

12. The correction method as claimed in claim 9, wherein the structures are mutually equidistant.

13. The correction method as claimed in claim 9, wherein in step D) the third and fourth sequences are determined such that virtual intersection points on the line which have distances with respect to the reference point corresponding to the target values are mutually equidistant.

14. The correction method as claimed in claim 9, wherein the mapping specification includes a polynomial.

15. The correction method as claimed in claim 9, further comprising:
   simulating a plurality of different lines through the calibration image; and
   determining a first and a second sequence of measured values and a third and a fourth sequence of target values with respect to each line; and
   using the sequences of each line for determining the mapping specification.

16. A correction method comprising:
   A) reading in image data representative of a calibration image of a calibration pattern recorded with an optical unit, wherein the calibration pattern comprises a plurality of structures and the calibration image comprises correspondingly imaged structures;

B) simulating a line through the calibration image, wherein the line extends through a reference point subdividing the line into a first half-line and a second half-line, each half-line intersecting the imaged structures at one or more intersection points;

C) determining a first and a second sequence of measured values representing distances resulting from the calibration image of the intersection points on the first half-line and on the second half-line with respect to the reference point;

D) determining a third and a fourth sequence of target values representing target distances of the intersection points on the first half-line and on the second half-line with respect to the reference point;

E) determining a mapping specification that at least approximately maps the target values of the third and fourth sequences to the measured values of the first and second sequences, or vice versa; and F) correcting image data of an image recorded using an optical unit with the mapping specification determined in step E);

wherein in step D) the respective smallest target values of the third and fourth sequences are predetermined so the sum of these two smallest target values corresponds to a predetermined value; and a ratio of the smallest target value of the third sequence to the smallest target value of the fourth sequence is equal to the ratio of the smallest measured value of the first sequence to the smallest measured value of the second sequence.

17. The correction method as claimed in claim 16, wherein the structures comprise parallel lines.

18. The correction method as claimed in claim 17, wherein the line intersects at least one of the imaged lines at an angle of at least 80°.

19. The correction method as claimed in claim 16, wherein the structures are mutually equidistant.

20. The correction method as claimed in claim 16, wherein the mapping specification includes a polynomial.

21. The correction method as claimed in claim 16, further comprising:
simulating a plurality of different lines through the calibration image; and
determining a first and a second sequence of measured values and a third and a fourth sequence of target values with respect to each line; and
using the sequences of each line for determining the mapping specification.

* * * * *